UNITED STATES PATENT OFFICE 1,969,650

PROCESS FOR THE MANUFACTURE OF FERTILIZER

Walter Klempt and Fritz Brodkorb, Dortmund-Eving, Germany, assignors to Gesellschaft für Kohlentechnik m. b. H., Dortmund-Eving, Germany, a German company No Drawing. Application April 12, 1932, Serial No. 604,858. In Germany April 4, 1931

6 Claims. (Cl. 71—9)

It is known that thiosulphates, as for instance ammonium-thiosulphate, can be converted into sulphates by being treated with sulphuric acid and by using for this procedure 1 molecule of thiosulphate per 1 molecule of sulphuric acid, there being then formed sulphur and sulphurous acid according to the equation $$(NH_4)_2S_2O_3 + H_2SO_4 = (NH_4)_2SO_4 + S + SO_2 + H_2O$$

It is also known that from ammonium thiosulphate exclusively ammonium sulphate and sulphur can be obtained if the decomposition of the ammonium thiosulphate with the sulphuric acid is carried out in such a proportion that 3 molecules of $(NH_4)_2S_2O_3$ are used together with 1 molecule of $H_2SO_4$. The reaction proceeds then under the primary formation of polythionates according to the equation $$3(NH_4)_2S_2O_3 + H_2SO_4 = 3(NH_4)_2SO_4 + 4S + H_2O$$

Instead of the sulphuric acid phosphoric acid may be used, as is also known. The reaction proceeds then according to the equation $$3(NH_4)_2S_2O_3 + 2H_3PO_4 = 2(NH_4)_2SO_4 + 2(NH_4)H_2PO_4 + 4S + H_2O$$

When endeavoring to make use of nitric acid for the decomposition of the ammonium thiosulphate difficulties are encountered in so far as in this case the nitric acid is decomposed and a brown vapor of nitric oxide is developed, if the procedure is carried out at an increased temperature which, however, entails a considerable loss of nitric acid. It has now been discovered that this loss can be completely obviated if nitric acid of any desired concentration is made to flow slowly and with stirring into a solution of ammonium thiosulphate either at ordinary temperature or in a slightly heated state, say heated to about 50° C., whereafter the liquid is heated to the proper operating temperature, preferably to from 80 to 100° C. In this way the nitric acid can be converted quantitatively into ammonium nitrate without even the slightest loss owing to its decomposition. The reaction proceeds in this case according to the equation $$3(NH_4)_2S_2O_3 + 2HNO_3 = 2(NH_4)_2SO_4 + 2NH_4NO_3 + 4S + 2H_2O$$

There is obtained in this way, with the employment solely of nitric acid, a mixed salt composed of ammonium sulphate and ammonium nitrate and being suited as a manuring means. If it is desired to incorporate into that manuring salt also other substances suited as manuring agents, as for instance phosphorus, a part of the nitric acid may be replaced by phosphoric acid, in which case the reaction proceeds about as follows:

$$3(NH_4)_2S_2O_3 + HNO_3 + H_3PO_4 = 2(NH_4)_2SO_4 + NH_4NO_3 + NH_4H_2PO_4 + 4S + H_2O$$

We are aware of the fact that phosphoric acid alone has already been used for the purpose in view, and we, therefore, do not lay any claim thereon. It is a matter of course that besides the phosphoric acid also other acids, as for instance muriatic acid can be used. When employing a mixture of several acids attention must be paid to the point that the total amount of the respective acids be so determined that the proportion of the mixture of acids to the thiosulphate, as stated, is not materially surpassed.

In order to reduce the reaction time it is advantageous for this purpose to make use of a slight excess of acid beyond the proportion of 3 molecules of thiosulphate per 2 molecules of nitric acid.

The process may be carried out, for instance, in this manner: Into a solution of $(NH_4)_2S_2O_3$ containing about from 30 to 40% thereof is introduced, under stirring, such an amount of nitric acid of any desired concentration that there are a little more than 2 molecules of nitric acid per 3 molecules of ammonium thiosulphate, and this mixture is then kept at a temperature of from 80 to 100° C. for about 6 hours. After all thiosulphate has disappeared the sulphur is separated from the still hot solution by means of a centrifugal machine, and the remaining solution is, after all of the acid has been rendered inactive, evaporated and concentrated until it crystallizes under vacuo in a suitable apparatus consisting preferably of aluminium. The segregated salt is separated from the remaining mother lye by means of a centrifugal apparatus, and that lye is conducted to the lye entering into the evaporating apparatus. Sometimes it is recommendable to inspissate the solution until it has the consistency of molasses or syrup, especially if also other substances of particular manuring value, such for instance as $KCl$, $KNO_3$, $K_2HPO_4$, $(NH_4)_2HPO_4$, $Ca(NO_3)_2$, $CaCO_3$, and the like, shall be incorporated into the fertilizer. By then cooling the mixture in a suitable manner there is at once obtained a fertilizer in the form of beads which is a particularly suitable form for manuring purposes.

The above-described improved process is particularly connected with the production of coke where while the gas is being desulphurated thiosulphate lyes with about from 30 to 40% of (NH$_4$)$_2$S$_2$O$_3$, together with a small amount of sulphur, are obtained. These lyes can at once be converted with the aid of acids in the manner stated, and these conversions present, therefore, a means to produce in the coking works, besides sulphur, also fertilizers of the most varied composition in a highly economical manner.

We claim:

1. In the process for the production of fertilizers and for obtaining sulphur at the same time by acting on ammonium-thiosulphate with such an amount of acid that there are introduced into the mixture substantially not more than 2 molecules of the acid per 3 molecules of the ammonium-thiosulphate, the step which consists in introducing nitric acid in the aforesaid proportion into a solution of ammonium-thiosulphate of room temperature, heating the mixture until the conversion has been finished, separating the segregated sulphur, and evaporating the liquid component of the remaining composition until the solid component remains as the final product, i. e. as the fertilizer.

2. In the process for the production of fertilizers and for obtaining sulphur at the same time by acting on ammonium-thiosulphate with such an amount of acid that there are introduced into the mixture substantially not more than 2 molecules of the acid per 3 molecules of the ammonium-thiosulphate, the step which consists in introducing nitric acid in the aforesaid proportion into a solution of ammonium-thiosulphate heated to a temperature substantially not surpassing 50° C., heating the mixture until the conversion has been finished, separating the segregated sulphur, and evaporating the liquid component of the remaining composition until the solid component remains as the final product, i. e. as the fertilizer.

3. In the process for the production of fertilizers and for obtaining sulphur at the same time by acting on ammonium-thiosulphate with such an amount of acid that there are introduced into the mixture substantially not more than 2 molecules of the acid per 3 molecules of the ammonium-thiosulphate, the step which consists in introducing a mixture of nitric acid and other acids in the aforesaid proportion into a solution of ammonium-thiosulphate of room temperature, heating the mixture until the conversion has been finished, separating the segregated sulphur, and evaporating the liquid component of the remaining compositions until the solid components remain as the final product, i. e. as the fertilizer.

4. In the process for the production of fertilizers and for obtaining sulphur at the same time by acting on ammonium-thiosulphate with such an amount of acid that there are introduced into the mixture substantially not more than 2 molecules of the acid per 3 molecules of the ammonium-thiosulphate, the step which consists in introducing a mixture of nitric acid and other acids in the aforesaid proportion into a solution of ammonium-thiosulphate heated to a temperature substantially not surpassing 50° C., heating the mixture until the conversion has been finished, separating the segregated sulphur, and evaporating the liquid component of the remaining compositions until the solid components remain as the final product, i. e. as the fertilizer.

5. In the process for the production of fertilizers and for obtaining sulphur at the same time by acting on ammonium-thiosulphate with such an amount of acid that there are introduced into the mixture substantially not more than 2 molecules of the acid per 3 molecules of the ammonium-thiosulphate, the step which consists in introducing nitric acid in the aforesaid proportion into a raw thiosulphite lye as resulting from the desulphuration of coke oven gases and having room temperature, heating the lye until the conversion has been finished, separating the segregated sulphur, and evaporating the liquid component of the remaining compositions until the solid component remains as the final product, i. e. as the fertilizer.

6. In the process for the production of fertilizers and for obtaining sulphur at the same time by acting on ammonium-thiosulphate with such an amount of acid that there are introduced into the mixture substantially not more than 2 molecules of the acid per 3 molecules of the ammonium-thiosulphate, the step which consists in introducing nitric acid in the aforesaid proportion into a raw thiosulphite lye as resulting from the desulphuration of coke oven gases and being heated to a temperature substantially not surpassing 50° C., heating the lye until the conversion has been finished, separating the segregated sulphur, and evaporating the liquid component of the remaining compositions until the solid components remain as the final product, i. e. as the fertilizer.

WALTER KLEMPT.
FRITZ BRODKORB.